United States Patent Office 3,371,083
Patented Feb. 27, 1968

3,371,083
PROCESS FOR PREPARING THERAPEUTICALLY USEFUL 3-SUBSTITUTED BENZODIAZEPINES
Rodney Ian Fryer, North Caldwell, Edward Ernest Garcia, West Caldwell, and Leo Henryk Sternbach, Upper Montclair, N.J., assignors to Hoffmann-La Roche Inc., Nutley, N.J., a corporation of New Jersey
No Drawing. Filed Dec. 9, 1965, Ser. No. 512,775
7 Claims. (Cl. 260—239.3)

This invention relates to novel useful chemical processes. More particularly, the herein disclosed invention relates to novel processes for preparing certain end products known prior to the present invention and which have been found to be useful both as therapeutic agents by virtue of their pharmaceutical activity and as intermediates in the preparation of other medicinally valuable 1,4-benzodiazepines.

As is noted above, the invention has for one of its objects, the preparation of medicinally valuable products. Such products are of the formula

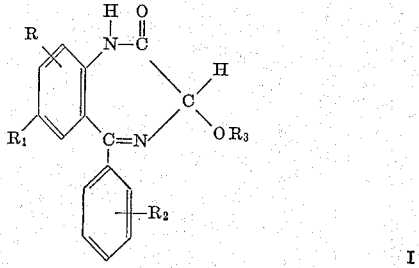

wherein R and $R_1$ are selected from the group consisting of hydrogen, halogen, nitro, trifluoromethyl and lower alkyl; $R_2$ is selected from the group consisting of hydrogen and halogen and $R_3$ is selected from the group consisting of acyl and lower alkyl.

The preparation of compounds of Formula I above is accomplished in two interrelated stages. The first stage which is novel, in and of itself, and hence constitutes a part of the present invention, involves treating a compound of the formula

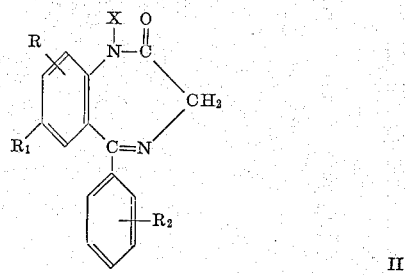

wherein R, $R_1$ and $R_2$ are as above and X is selected from the group consisting of chlorine, bromine and iodine with a free radical catalyst in the presence of an inert organic solvent medium. Such a treatment results in a compound of the formula

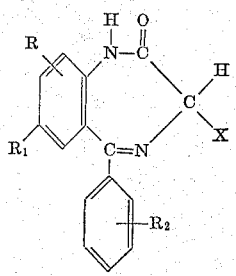

wherein X, R, $R_1$ and $R_2$ are as above.

In the second stage of the process of the present invention, the so-formed compound of the Formula III above, with or, most preferably, without isolation from the reaction medium in which it is prepared, is treated with a compound of the formula $$MOR_3 \qquad \text{IV}$$

wherein M is selected from the group consisting of hydrogne, alkali metals and alkaline earth metals and $R_3$ is as above.

Any free redical catalyst which is capable of effecting the conversion of compounds of the Formula II above to the corresponding compounds of the Formula III above is included within the purview of the present invention. Representative of such free radical catalysts are azo-bis-lower alkyl nitriles such as azobisisobutyronitrile; di-lower alkyl peroxides such as di-t-butylperoxides; di-acyl-peroxides such as di-lower alkanoyl peroxides (e.g., acetylperoxide) and benzoyl peroxide, peresters such as t-butyl peracetate, t-butyl perbenzoate and t-butyl perphthalate; hydroperoxides such as t-butyl hydroperoxide and cumene hydroperoxide and the like. Especially preferred for the purposes of the present invention are azo-bis-lower alkyl nitriles, most advantageously, azobisisobutyronitrile.

In one advantageous aspect, the first stage of the process described herein is conducted in the presence of any suitable inert organic solvent. Representative of such suitable solvents are aromatic hydrocarbons, e.g., benzene, xylene and toluene, carbon tetrachloride, chlorinated aromatic hydrocarbons such as chlorobenzene and the like. Temperature and pressure are not critical features of the said first stage and thus, this step can be effected at room temperature and atmospheric pressure or above room temperature. However, it should be evident to those skilled in the art that the temperature at which the reaction is run is determined in some respects by the free radical catalyst employed. It is well-known that some radical formation, which is caused by bond dissociation, occurs at room temperature. Thus, with a catalyst that dissociates at room temperature, the first stage may be conducted at room temperature. Most free radical catalysts, however, dissociate at above room temperature. Thus, it is preferred to conduct the said first stage at elevated temperatures, advantageously, at about the reflux temperature of the reaction medium.

In the second stage of the process of the present invention, if a compound of the Formula I above wherein $R_3$ is lower alkyl is desired, a compound of the Formula IV above ($MOR_3$) wherein M is hydrogen and $R_3$ is lower alkyl, i.e., a lower alkanol such as ethanol, propanol, isopropanol and the like, is utilized to effect such a desideratum. The lower alkanol can itself serve as the reaction medium or alternatively, this conversion can be effected in the presence of any suitable inert organic solvent.

If a compound corresponding to Formula I above wherein $R_3$ is acyl is desired, a compound of the Formula III above, with or without isolating the latter from the reaction medium in which it is prepared, is reacted with a compound of the Formula IV above ($MOR_3$) wherein M is as above and $R_3$ is acyl. Preferably, in this embodiment, M in Formula IV above is sodium and $R_3$ is a lower alkanoyl group such as acetyl. The compound so obtained can be hydrolyzed employing any convenient hydrolyzing technique such as treatment with a base in a solvent, e.g., a methanolic solution of sodium hydroxide, to thereby form a compound corresponding to Formula I above having a hydroxyl group in position-3, rather than the group designated hereinabove as $R_3$.

The term "lower alkyl" as utilized throughout the present specification and claims comprehends both straight and branched chain hydrocarbon groups, such as methyl, ethyl, n-propyl, isopropyl, isobutyl and the like. The term "halogen" as employed herein is intended to connote all four forms thereof, e.g., iodine, bromine, chlorine and fluorine, unless otherwise specified. The expression "lower acyl" refers to the acyl moiety of a carboxylic acid such as benzoyl or a straight or branched chain lower alkanoyl moiety, e.g., acetyl, propionyl and the like. Representative of alkali metals and alkaline earth metals are sodium, potassium, calcium, magnesium and the like.

In the compounds of Formula I above, R and $R_2$ are preferentially hydrogen and $R_1$ is preferentially halogen, most advantageously, chlorine. Preferred among the compounds of Formulas II and III above for the purposes of the present invention are those wherein X is chlorine, R and $R_2$ are hydrogen and $R_1$ is halogen, preferentially, chlorine.

The foregoing is a general description of the main synthetic routes for the preparation of certain end products useful as medicinal agents. It will be readily apparent to one skilled in the art that variations of these procedures are possible.

The following examples are illustrative but not limitative of the present invention. All temperatures are stated in degrees centigrade.

EXAMPLE 1

A solution of 3.5 g. (0.011 mole) of 1,7-dichloro-1,3-dihydro-5-phenyl-2H-1,4-benzodiazepin-2-one and 0.1 g. of azodiisobutyronitrile in 200 ml. of benzene was refluxed for 1 hour. After cooling to room temperature, the resulting suspension was filtered. The benzene filtrate so-obtained was concentrated to dryness and the residue which contained 3,7-dichloro-1,3-dihydro-5-phenyl - 2H- 1,4-benzodiazepin-2-one was heated on the steam bath with 60 ml. of ethanol. The ethanol was removed in vacuo and the residue treated with 250 ml. of ether and 250 ml. of water. The suspended solid was filtered and washed with ether. The ether layer was rapidly separated, washed and dried. On standing at room temperature, the ether deposited 7-chloro-1,3-dihydro-3-ethoxy-5-phenyl-2H-1,4-benzodiazepin-2-one, M.P. 209–211°. Recrystallization from acetonitrile-water gave the product as white crystals of melting point 214–216°.

The 1,7-dichloro-1,3-dihydro-5-phenyl-2H-1,4 - benzodiazepin-2-one utilized as a starting material in the above exemplified preparative technique and the method by which it is obtained does not constitute a part of the present invention, but the said method is disclosed hereinbelow in order that the instant disclosure may be complete.

A stirred suspension of 2.7 g. of 7-chloro-1,3-dihydro-5-phenyl-2H-1,4-benzodiazepin-2-one in 20 ml. of dichloromethane was cooled in ice-water and there was added to the so-stirred mixture, 1.2 g. of tert-butyl hypochlorite. The suspended solid dissolved in approximately 15 minutes. The solvent was removed by evaporation at 38° and the residue added to isopropyl ether. 1,7-dichloro - 1,3-dihydro-5-phenyl-2H-1,4-benzodiazepin - 2-one as white crystals were obtained.

EXAMPLE 2

A solution of 3.5 g. (0.011 mole) of 1,7-dichloro-1,3-dihydro-5-phenyl-2H-1,4-benzodiazepin-2-one and 0.1 g. of azodiisobutyronitrile in 200 ml. of benzene was refluxed for one hour. After cooling to room temperature, the resulting suspension was filtered. The benzene filtrate so-obtained was concentrated to dryness and the residue which contained 3,7-dichloro-1,3-dihydro-5-phenyl-2H-1,4-benzodiazepin-2-one was heated on the steam bath with 70 ml. of acetic acid and 1 g. of sodium acetate. After heating for 20 minutes on the steam bath, the acetic acid was removed and the residue extracted with choroform. After washing and drying the chloroform extract, concentrating the same in vacuo and adding ether to the concentrate, a brown solid was obtained. Recrystallization of the latter from ethanol-water gave white crystals of 3-acetoxy-7-chloro-1,3-dihydro-5-phenyl-2H-1,4-benzodiazepin-2-one of melting point 233–237°.

We claim:
1. A process for the preparation of a compound of the formula

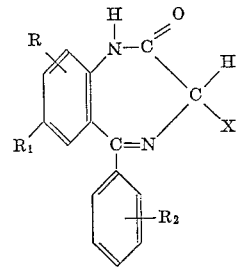

(I)

wherein R and $R_1$ are selected from the group consisting of hydrogen, halogen, nitro, trifluoromethyl and lower alkyl; $R_2$ is selected from the group consisting of hydrogen and halogen and X is selected from the group consisting of chlorine, bromine and iodine which comprises treating a compound having the formula of

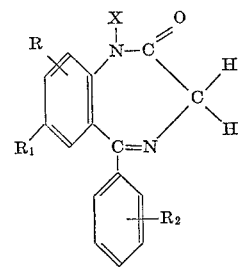

(II)

wherein X, R, $R_1$ and $R_2$ are as above with a free radical catalyst selected from the group consisting of azo-bis-lower alkyl nitriles, di-lower alkyl peroxides, di-acyl peroxides, peresters and hydroperoxides in the presence of an inert organic solvent.

2. A compound as defined in claim 1 wherein the free radical catalyst utilized is azobisisobutyronitrile.

3. A compound as defined in claim 1 wherein $R_1$ is halogen and R and $R_2$ are both hydrogen.

4. A process as defined in claim 3 wherein the free radical catalyst utilized is azobisisobutyronitrile.

5. A process as defined in claim 1 which includes the additional step of reacting a compound of the Formula I illustrated therein with a compound of the formula $MOR_3$ wherein M is selected from the group consisting of hydrogen, alkali metals and alkaline earth metals and $R_3$ is selected from the group consisting of lower alkyl and acyl.

6. A process as defined in claim 5 wherein $R_1$ is halogen and R and $R_2$ are both hydrogen.

7. A process as defined in claim 5 wherein $R_3$ is a lower alkanoyl group.

References Cited

UNITED STATES PATENTS 3,340,253   9/1967   Reeder et al. _____ 260—239.3

JOHN D. RANDOLPH, *Primary Examiner.*

WALTER A. MODANCE, *Examiner.*

R. T. BOND, *Assistant Examiner.*